Patented July 17, 1934

UNITED STATES PATENT OFFICE 1,966,635

MANUFACTURE OF MONOALKYL ETHERS OF AROMATIC POLYHYDROXY COMPOUNDS

Karl Marx, Dessau in Anhalt, and Erich Lehmann, Wolfen, near Bitterfeld, Germany, assignors to General Aniline Works, Inc., New York, N. Y., a corporation of Delaware No Drawing. Application January 23, 1932, Serial No. 588,496. In Germany February 10, 1931

6 Claims. (Cl. 260—150)

Our present invention relates to an improvement in the manufacture of monoalkyl ethers of aromatic polyhydroxy compounds and provides an improved process for manufacturing these products in a very pure state and with an excellent yield.

It is known to prepare, for instance, 1-methoxy-2-hydroxybenzene by treating an alkaline pyrocatechol solution with a methylating agent, such as dimethyl sulfate. When alkylating aromatic polyhydroxy compounds in this manner, there are not at all formed the mono-ethers alone, even when stoichiometric quantities of the parent materials are used, but there are formed at the same time considerable quantities of undesired poly-ethers, which can be transformed into the mono-ethers only by complicated methods. It has also been proposed in the production of mono-ethers of polyhydric phenols, to add poly-ethers to the methylation mixture from the very beginning, in order to largely avoid their being newly formed. But also in this case a separation of the ether mixture and a splitting of the poly-ethers is required.

According to this invention, the monoalkyl-ethers of aromatic polyhydroxy compounds are obtained with a good yield and in a very pure state without any admixture of poly-ethers by causing a chloro-alkane to act upon an anhydrous monoalkali salt of a polyhydroxy compound suspended in a suitable organic liquid. The reaction occurs without any essential formation of by-products.

The following examples illustrate the invention, the parts being by weight:—

*Example 1.*—69 parts of metallic sodium are introduced into a solution of 330 parts of 1.2-dihydroxybenzene in 1500 parts of anhydrous alcohol. After the evolution of hydrogen has ceased, the alcohol is distilled; the monosodium compound which remains is suspended in 1500 parts of chlorobenzene, and then 190 parts of chloromethane are added. The mass is heated for 20 hours at 140° C. to 145° C. After cooling, the reaction product is mixed with a solution of 160 parts of sodium hydroxide in 500 parts of water and the chlorobenzene is blown off by means of steam. After acidification the 1-methoxy-2-hydroxybenzene is distilled with steam. The guaiacol dissolved in water is extracted and distilled together with the main quantity.

The yield of pure 1-methoxy-2-hydroxybenzene amounts to 280 parts, that is 75 per cent of the theory. The pyrocatechol which has not participated in the reaction can be recovered by extracting the residue of the steam distillation. No di-ether is formed.

*Example 2.*—69 parts of metallic sodium are slowly introduced into a solution of 330 parts of 1.2-dihydroxybenzene in 1500 parts of anhydrous alcohol. After the alcohol has been distilled off, 1500 parts of xylene and 230 parts of chloro-ethane are added, whereupon the whole is heated for 20 hours at 190° C. to 200° C. and worked up as indicated in Example 1. No di-ether is formed.

The yield of 1-ethoxy-2-hydroxybenzene amounts to 299 parts, that is 76 per cent of the theory.

In a completely analogous manner 1.3-dihydroxybenzene and 1.4-dihydroxybenzene may be converted into the corresponding monomethyl or ethyl ethers.

When substituting for the 330 parts of 1.2-dihydroxybenzene used in the foregoing example, 378 parts of 1.3.5-trihydroxybenzene a pure monoethyl ether is obtainable without formation of by-products.

*Example 3.*—46 parts of metallic sodium are introduced into a solution of 320 parts of 2.7-dihydroxynaphthalene in 1000 parts of anhydrous alcohol. After the alcohol has been distilled off, 1000 parts of toluene and 190 parts of chloro-methane are added, whereupon the whole is heated for about 15 hours at 240° C. The product is worked up as indicated in Example 1.

262 parts of 2-methoxy-7-hydroxynaphthalene are obtained. The yield therefore amounts to 75 per cent of the theory.

In a similar manner other monoethers of polyhydroxynaphthalene, for instance, of 1.5-, 2.6-, or 1.8-dihydroxynaphthalene are obtainable.

It is obvious that our invention is not limited to the foregoing examples or to the specific details given therein. Thus, we may prepare in the first step of the process the monopotassium compounds of the polyhydroxybenzenes or naphthalenes. On the other hand, we may use as an etherifying agent a propyl- or butyl chloride, whereby the corresponding higher ethers are obtainable. As a medium in which the double decomposition of the alkyl chloride with the monoalkali metal compound of the polyhydroxy benzene or naphthalene may be performed, we have mentioned in the examples chlorobenzene, xylene and toluene. These organic liquids likewise may be substituted by other compounds which are inert as well to the alkali metal compound as to the chloroalkane. Thus, we may use, for instance, benzene, aliphatic hydrocarbons, such as petroleum distillates boiling between 150 to 300° C. or hydrated aromatic hydrocarbons, such as hexahydrobenzene, tetrahydronaphthalene and similar compounds. Inasmuch as the reacting mixture may be heated to a temperature higher than the boiling point of the chloroalkane and the organic suspending medium for the alkali metal compound, the reaction is carried out in a pressure vessel. The organic liquids preferably are used in a completely anhydrous state.

What we claim is:—

1. The process of manufacturing monoalkyl ethers of aromatic polyhydroxy compounds which comprises acting with a chloro-alkane upon an anhydrous monoalkali metal compound of an aromatic polyhydroxy compound suspended in an organic liquid which is inert to the reacting components.

2. The process of manufacturing monoalkyl ethers of aromatic polyhydroxy compounds which comprises acting with a chloro-alkane upon an anhydrous monoalkali metal compound of a polyhydroxybenzene suspended in an organic liquid of the group consisting of benzene, toluene, xylene and chlorobenzene.

3. The process of manufacturing a monoalkyl ether of 1.2-dihydroxybenzene which comprises acting with a chloro-alkane upon an anhydrous monoalkali metal compound of 1.2-dihydroxybenzene suspended in an organic liquid of the group consisting of benzene, toluene, xylene and chlorobenzene.

4. The process which comprises suspending the dry monosodium compound of 1.2-dihydroxybenzene in an organic liquid of the group consisting of hydrocarbons of the benzene series and chlorobenzene, adding a chloro-alkane and heating the mixture to about 140 to about 200° C.

5. The process which comprises suspending the dry monosodium compound of 1.2-dihydroxybenzene in chlorobenzene, adding chloromethane and heating the mixture to about 140 to about 145° C.

6. The process which comprises suspending the dry monosodium compound of 1.2-dihydroxybenzene in xylene, adding chloroethane and heating the mixture to about 190° C. to about 200° C.

KARL MARX.
ERICH LEHMANN.